(12) United States Patent
Morita

(10) Patent No.: US 10,322,482 B2
(45) Date of Patent: Jun. 18, 2019

(54) NUMERICAL CONTROLLER FOR MACHINE TOOL

(71) Applicant: FANUC CORPORATION, Minamitsuru-gun, Yamanashi (JP)

(72) Inventor: Yuuki Morita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/821,044

(22) Filed: Nov. 22, 2017

(65) Prior Publication Data

US 2018/0147680 A1 May 31, 2018

(30) Foreign Application Priority Data

Nov. 28, 2016 (JP) .................................. 2016-230673

(51) Int. Cl.
*G06F 19/00* (2018.01)
*B23Q 5/10* (2006.01)
*G05B 19/416* (2006.01)

(52) U.S. Cl.
CPC .......... *B23Q 5/10* (2013.01); *G05B 19/4163* (2013.01); *B23Q 2705/02* (2013.01); *G05B 2219/37389* (2013.01); *G05B 2219/41391* (2013.01); *G05B 2219/49077* (2013.01)

(58) Field of Classification Search
CPC combination set(s) only.
See application file for complete search history.

(56) References Cited

U.S. PATENT DOCUMENTS

| 4,787,049 A | * | 11/1988 | Hirata | G05B 19/4163 318/561 |
| 5,170,358 A | * | 12/1992 | Delio | G05B 19/4163 173/2 |
| 5,404,308 A | | 4/1995 | Kajiyama | |
| 6,508,614 B1 | | 1/2003 | Ozaki et al. | |
| 2003/0004605 A1 | * | 1/2003 | Hamamura | G05B 19/4163 700/188 |
| 2003/0065149 A1 | * | 4/2003 | McGinnis | A61J 1/10 530/385 |

FOREIGN PATENT DOCUMENTS

| JP | 5-69275 | 3/1993 |
| JP | 2000-263377 | 9/2000 |
| JP | 2013-56392 | 3/2013 |

* cited by examiner

*Primary Examiner* — Kidest Bahta
(74) *Attorney, Agent, or Firm* — Wenderoth, Lind & Ponack, L.L.P.

(57) ABSTRACT

To provide a numerical controller for a machine tool capable of reducing heat generation and realizing stable heavy cutting, and also capable of realizing efficient light cutting. A numerical controller comprises: first speed change means which changes the feed speed of a feed axis drive motor at the start of cutting to an initial speed lower than a command speed, based on magnetic flux content at the start of cutting; and second speed change means which changes the feed speed from the initial speed to the command speed continuously or intermittently based on time elapsed from the start of cutting and a time constant for change in the magnetic flux content.

18 Claims, 8 Drawing Sheets

NUMERICAL CONTROLLER FOR MACHINE TOOL

This application is based on and claims the benefit of priority from Japanese Patent Application No. 2016-230673, filed on 28 Nov. 2016, the content of which is incorporated herein by reference.

BACKGROUND OF THE INVENTION

Field of the Invention

The present invention relates to a numerical controller for a machine tool with a spindle motor formed from an induction motor, and a feed axis drive motor.

Related Art

In a relatively large number of cases, when cutting of a work is performed using a machine tool with a spindle and a feed axis, the spindle and the feed axis operate in an interlocked fashion. In such cases, a numerical controller for control over the machine tool has generally been used for controlling the feed axis by using a characteristic value or a measured value related to the spindle, or conversely, for controlling the spindle by using a characteristic value or a measured value related to the feed axis.

For example, patent document 1 discloses a technique wherein the feed speed is controlled using data generated by correcting the number of rotations of the spindle motor using the variation of the number of rotations, in order to realize high-precision cutting even in cases where sudden changes occur in the actual speed of the spindle motor used as the spindle motor.

Moreover, patent document 2 discloses a technique wherein the feed speed of the cutting feed means is controlled in such a manner that the motor under use for the cutting has a load current value not exceeding the maximum load current value which corresponds to the intended flatness, in order to cut the cutting target which is to be cut first, such as a semiconductor wafer, to an intended flatness in a single cutting operation.

Moreover patent document 3 discloses a technique wherein an excitation current in a hydrostatic magnetic composite bearing is detected in order to grasp the state of die cutting.

Patent Document 1: Japanese Unexamined Patent Application, Publication No. H05-69275
Patent Document 2: Japanese Unexamined Patent Application, Publication No. 2013-56392
Patent Document 3: Japanese Unexamined Patent Application, Publication No. 2000-253377

SUMMARY OF THE INVENTION

In some cases, an induction motor has been used as the spindle motor of a machine tool. The induction motor mentioned herein is a motor in which an excitation current is caused to flow in a stator coil to generate a rotating magnetic field, while an induction current is generated in a rotor and resultant magnetic force is used for rotating the rotor so as to follow the rotation of the rotating magnetic field. The induction motor has had a drawback that the flow of the excitation current in the stator coil generates heat. In order to overcome this drawback, there has been a technique wherein the magnetic flux of the rotating magnetic field or the excitation current is weakened in cases where the load on the induction motor is low so that a high torque is not required. However, in cases where this technique is used, if heavy cutting (cutting producing a high cutting resistance), wherein a high load is applied from the feed axis drive motor on the spindle motor, is started with a reduced torque due to weakening of the magnetic flux at the induction motor as the spindle motor, the load may change suddenly at the start of cutting, consequently reducing the speed of the spindle seriously or stopping the spindle.

In this regard, patent documents 1 and 2 described above are not intended to reduce heat generation and to prevent reduction in the spindle speed or stopping of the spindle. Further, in patent document 3, the detected excitation current value is used merely for grasping the state of cutting.

Additionally, when light cutting is done after adjustment is made in order to reduce heat generation or realize stable heavy cutting, the cutting efficiency is reduced if a low speed is maintained for the feed axis, for example. Hence, a technique which is simultaneously responsive to such a problem has been desired.

The present invention is intended to provide a numerical controller for a machine tool capable of reducing heat generation and realizing stable heavy cutting, and capable of realizing efficient light cutting.

(1) A numerical controller according to the present invention (numerical controller 100, 200 described later, for example) controls a machine tool (machine tool 150 described later, for example) with a spindle motor (induction motor 125 described later, for example) formed from an induction motor, and a feed axis drive motor (servo motor 145 described later, for example). The numerical controller comprises: magnetic flux content acquisition means (magnetic flux content acquisition means 102 described later, for example) which acquires magnetic flux content at the spindle motor; storage means (storage means 109 described later, for example) which stores a time constant for change in the magnetic flux content at the spindle motor; speed command means (speed command means 108 described later, for example) which accepts a command speed and issues a command instructing the feed speed to the feed axis drive motor; elapsed time calculation means (elapsed time calculation means 107 described later, for example) which calculates time elapsed from the start of cutting; first speed change means (first speed change means 103A described later, for example) which commands the speed command means to change the feed speed of the feed axis drive motor at the start of cutting to an initial speed lower than the command speed, based on the magnetic flux content at the start of cutting acquired by the magnetic flux content acquisition means; and second speed change means (second speed change means 103B described later, for example) which commands the speed command means to change the feed speed from the initial speed to the command speed continuously or intermittently based on the elapsed time calculated by the elapsed time calculation means and the time constant for change in the magnetic flux content stored in the storage means.

(2) In the numerical controller described in (1), the magnetic flux content acquisition means (magnetic flux content acquisition means 102 described later, for example) may estimate magnetic flux content at the spindle motor (induction motor 125 described later, for example) and acquire the estimated magnetic flux content as the current magnetic flux content.

(3) In the numerical controller described in (1) or (2), the first speed change means (first speed change means 103A described later, for example) may give a command to the speed command means (speed command means 108 described later, for example) to change the feed speed of the feed axis drive motor (servo motor 145 described later, for example) to the initial speed, based on a magnetic flux content ratio which is the ratio of the magnetic flux content at the start of cutting to a maximum magnetic flux content.

(4) In the numerical controller described in (3), the numerical controller (numerical controller 100, 200 described later, for example) may further comprise: ratio calculation means (ratio calculation means 104 described later, for example) which calculates the magnetic flux content ratio based on the magnetic flux content acquired by the magnetic flux content acquisition means (magnetic flux content acquisition means 102 described later, for example); and ratio notification means (ratio notification means 105 described later, for example) which notifies the first speed change means of the magnetic flux content ratio calculated by the ratio calculation means.

A numerical controller for a machine tool provided by the present invention is capable of reducing heat generation and realizing stable heavy cutting, and capable of realizing efficient light cutting.

DETAILED DESCRIPTION OF THE INVENTION

First Embodiment

Figure 1:
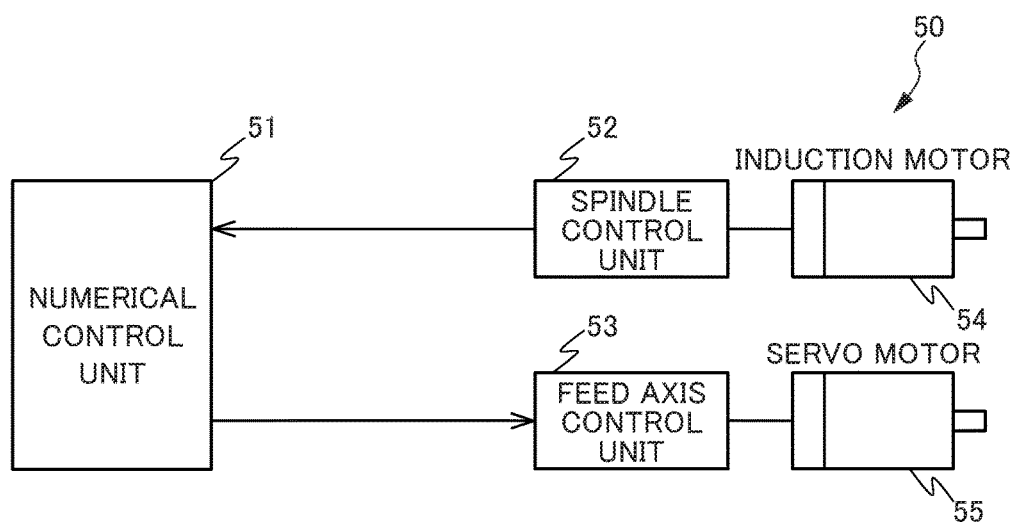
FIG. 1 is a conceptual view of the present invention.

A first embodiment of the present invention will be described below by referring to FIGS. 1 to 4. FIG. 1 shows a basic concept of the present invention. A numerical control system 50 includes a numerical control unit 51, a spindle control unit 52, a feed axis control unit 53, an induction motor 54 as a spindle motor, and a servo motor 55 as a feed axis drive motor. The numerical control unit 51 controls the induction motor 54 through the spindle control unit 52, and controls the servo motor 55 through the feed axis control unit 53. In the conceptual view of FIG. 1, a numerical controller is formed from the numerical control unit 51 and the feed axis control unit 53.

In cases where the induction motor 54 is used as the spindle motor, if heavy cutting is started while the magnetic flux at the induction motor 54 is weak, the load may change suddenly at the start of cutting, consequently reducing the speed of the spindle seriously or stopping the spindle. In response to this issue, the spindle control unit 52 acquires magnetic flux content at the induction motor 54. The spindle control unit 52 transmits to the numerical control unit 51 the acquired magnetic flux content or, as another example, the ratio of a current magnetic flux content to a maximum magnetic flux content at the induction motor 54 (hereinafter also called a "magnetic flux content ratio"). The numerical control unit 51 transmits data of the magnetic flux content or the magnetic flux content ratio to the feed axis control unit 53.

In this embodiment, based on data of the magnetic flux content at the start of cutting or the magnetic flux content ratio at the start of cutting, the feed axis control unit 53 transmits to the servo motor 55 a movement command containing information on the feed speed at the start of cutting (initial speed), etc. In this embodiment, the feed axis control unit 53 continuously or intermittently transmits to the servo motor 55 a movement command which contains information on the feed speed, etc. calculated based on time elapsed from the start of cutting and a time constant for change in magnetic flux content.

As described above, the spindle control unit 52 transmits magnetic flux content or a magnetic flux content ratio to the numerical control unit 51, but in actuality, the spindle control unit 52 and the numerical control unit 51 make bi-directional communication at constant intervals. Thus, the spindle control unit 52 may transfer magnetic flux content or a magnetic flux content ratio to the numerical control unit 51 while making this communication.

Figure 2:
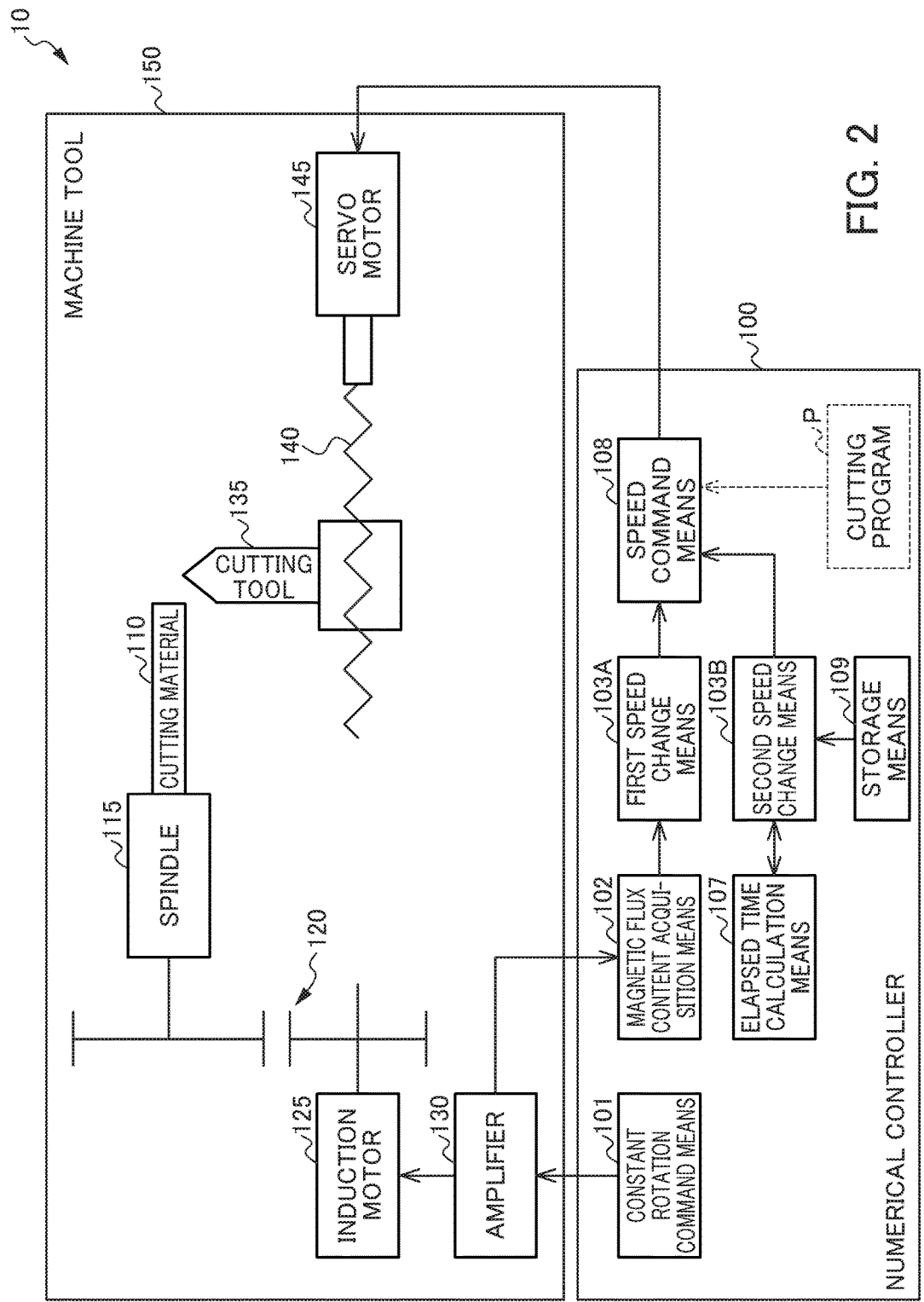
FIG. 2 shows the configuration of a control system according to a first embodiment of the present invention.

FIG. 2 shows an example of the configuration of a numerical control system 10 according to the first embodiment of the present invention. The numerical control system 10 includes a numerical controller 100 and a machine tool 150. The machine tool 150 includes: a spindle 115 to which a cutting material 110 is to be attached; a speed changer 120; an induction motor 125 functioning as the above-described spindle motor for rotating the spindle 115 through the speed changer 120; an amplifier 130 which outputs a driving current for the induction motor 125; a cutting tool 135 used for cutting the cutting material 110; a ball screw 140 which moves the cutting tool 135 in an axial direction; and a servo motor 145 functioning as the above-described feed axis drive motor for rotating the ball screw 140.

The numerical controller 100 controls the induction motor 125 and the servo motor 145 so as to realize intended cutting of the cutting material 110 attached to the spindle 115 which rotates according to the rotation of the induction motor 125 with the cutting tool 135 which moves according to the rotation of the ball screw 140. Specifically, the numerical controller 100 includes: constant rotation command means 101 which inputs a constant rotation command signal to the amplifier 130; magnetic flux content acquisition means 102 which acquires a current magnetic flux content at the induction motor 125 from the amplifier 130; speed command means 108 which outputs speed information as a movement command to the servo motor 145; first speed change means 103A; second speed change means 103B; elapsed time calculation means 107; and storage means 109. In the cases of a motor with an axis to rotate, the speed means the rotation speed. While not shown in the drawings, the numerical controller 100 may have components and functions similar to those of a general numerical controller. A motor is not limited to a motor with an axis which rotates, and it may be a linear motor. If the cases of linear motors, the speed means the linear speed or the curvilinear speed. In this embodiment, the amplifier 130 of FIG. 2 corresponds to the spindle control unit 52 of FIG. 1. The speed command means 108, the first speed change means 103A, and the second speed change means 103B of FIG. 2 correspond to the feed axis control unit 53 of FIG. 1.

The magnetic flux content acquisition means 102 acquires the current magnetic flux content at the induction motor 125 from the amplifier 130. The magnetic flux content acquisition means 102 acquires magnetic flux content at the induction motor 125 at the start of cutting from the amplifier 130. The method by which the magnetic flux content acquisition means 102 acquires (estimates) information on magnetic flux content is described later by referring to FIG. 4.

The speed command means 108 outputs speed information as a movement command to the servo motor 145. More specifically, the speed command means 108 generally accepts information on a command speed from a cutting program P, for example, and issues a command instructing a feed speed to the servo motor 145 based on the information on the command speed.

Further, the speed command means 108 accepts a command from the first speed change means 103A described later to change the feed speed of the servo motor 145 at the start of cutting to an initial speed lower than the command speed. Then, based on the accepted change command, the speed command means 108 commands the servo motor 145 to change the feed speed to the initial speed (outputs initial speed information).

Further, the speed command means 108 accepts a command from the second speed change means 103B described later to change the feed speed of the servo motor 145 from the initial speed to the command speed continuously or intermittently. Then, based on the accepted change command, the speed command means 108 commands the servo motor 145 continuously or intermittently to change the feed speed from the initial speed to the command speed (outputs information on the changed speed continuously or intermittently).

As described above, the speed command means 108 is configured to output the command speed acquired from the cutting program P, for example, to the servo motor 145. The speed command means 108 is further configured to output a changed speed to the servo motor 145 based on a change command from each of the first speed change means 103A and the second speed change means 103B.

Based on the magnetic flux content at the start of cutting acquired by the magnetic flux content acquisition means 102, the first speed change means 103A commands the speed command means 108 to change the feed speed of the servo motor 145 at the start of cutting to the initial speed lower than the command speed. By doing so, the feed speed of the servo motor 145 is adjusted to a speed at which heat generation is reduced and stable heavy cutting is realized.

Based on elapsed time calculated by the elapsed time calculation means 107 described later and a time constant for change in magnetic flux content stored in the storage means 109 described later, the second speed change means 103B commands the speed command means 108 to change the feed speed from the initial speed to the command speed continuously or intermittently. By doing so, the feed speed of the servo motor 145 is changed from the initial speed to the command speed within a predetermined period according to the time constant.

The elapsed time calculation means 107 calculates time elapsed from the start of cutting. The elapsed time calculation means 107 calculates time elapsed from the start of cutting by acquiring temporal information from a clock unit not shown in the drawings, for example.

The storage means 109 stores a time constant for change in magnetic flux content at the induction motor 125. The storage means 109 may store one time constant or multiple time constants set according to magnetic flux content at the start of cutting.

Figure 3:
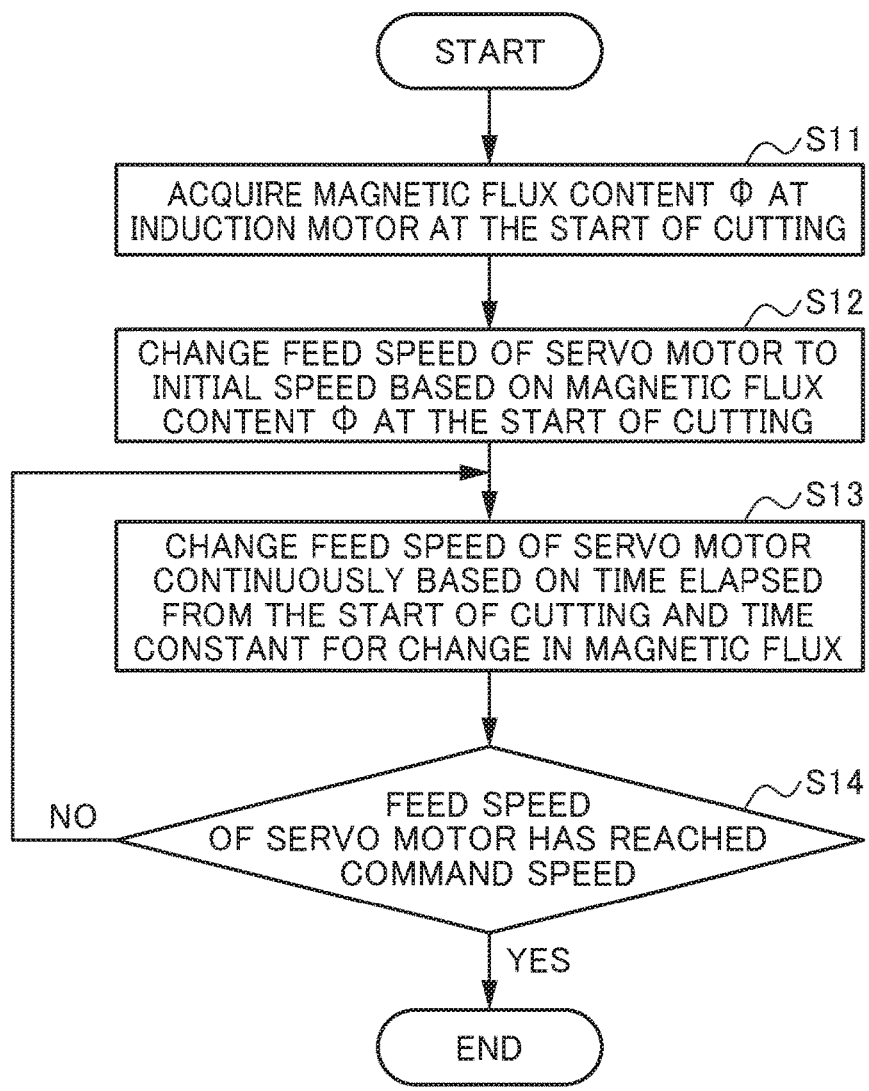
FIG. 3 shows the operation of the control system according to the first embodiment of the present invention.

FIG. 3 shows the operation of the numerical control system 10 according to the first embodiment. In step S11, the magnetic flux content acquisition means 102 acquires a current magnetic flux content Φ (at the start of cutting) at the induction motor 125 from the amplifier 130.

The magnetic flux content acquisition means 102 may directly acquire from the induction motor 125 the current magnetic flux content Φ (at the start of cutting) at the induction motor 125. Alternatively, the magnetic flux content acquisition means 102 may sense the current magnetic flux content Φ. Still alternatively, the magnetic flux content acquisition means 102 may estimate the current magnetic flux content Φ according to, for example, an excitation current amount at the induction motor 125. The following describes an example of an estimation method by referring to FIG. 4.

Figure 4:
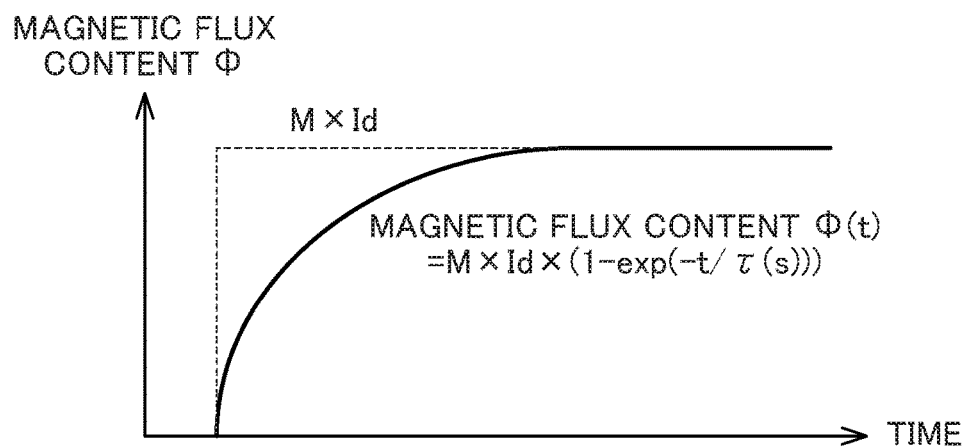
FIG. 4 is an explanatory view of a method of estimating magnetic flux content according to the present invention.

The magnetic flux content Φ at the induction motor is proportional to the product of an excitation current (Id) for generating magnetic flux and a mutual inductance M of the induction motor. A numerical controller for the induction motor changes the excitation current according to a target magnetic flux content. However, the actual magnetic flux shows a first-order lag response with a time constant τ(s) from changes in the excitation current. If the excitation current Id of a constant amount is caused to flow continuously from a state where the excitation current Id is zero and the magnetic flux content Φ is zero, the magnetic flux content Φ(t) after lapse of t (sec) is estimated by the following formula, as shown in FIG. 4:

$$\Phi(t)=M \times Id \times (1-exp(-t/\tau(s)))$$

For actual calculation, either the command value or the feedback value of the excitation current is used as the excitation current Id, and the output generated by applying the primary low-pass filter to the time constant τ (M×Id) which is obtained in every control cycle is used as a estimated magnetic flux value. The magnetic flux content acquisition means 102 estimates the magnetic flux content at the induction motor 125 and acquires the estimated magnetic flux content as the current magnetic flux content (at the start of cutting).

Next, in step S12, the first speed change means 103A commands the speed command means 108 to change the rotation speed of the servo motor 145 to an initial speed lower than the command speed, according to the current magnetic flux content Φ (at the start of cutting) at the induction motor 125 acquired by the magnetic flux content acquisition means 102. Specifically, if the current magnetic flux content Φ (at the start of cutting) is high, the rotation speed of the servo motor 145 is increased. If the current magnetic flux content Φ (at the start of cutting) is low, the rotation speed of the servo motor 145 is reduced. The feed speed of the ball screw 140 as a feed axis corresponds to the product of the rotation speed of the servo motor 145 and the pitch width of the ball screw 140. Thus, the feed speed of the feed axis is changed by changing the rotation speed of the servo motor 145. Then, based on the accepted change command, the speed command means 108 commands the servo motor 145 to change the feed speed to the initial speed (outputs initial speed information).

Next, in step S13, based on elapsed time calculated by the elapsed time calculation means 107 and a time constant for change in the magnetic flux content stored in the storage means 109, the second speed change means 103B commands the speed command means 108 to change the feed speed from the initial speed to the command speed continuously or intermittently. Then, based on the accepted change command, the speed command means 108 commands the servo motor 145 continuously or intermittently to change the feed speed from the initial speed to the command speed (outputs information on the changed speed continuously or intermittently).

Next, in step S14, if the feed speed of the servo motor 145 has not reached the command speed (N), the processing returns to step S13. If the feed speed of the servo motor 145 has reached the command speed (Y), the processing is finished and the speed command means 108 outputs the command speed to the servo motor 145.

Effect Achieved by First Embodiment

In the numerical control system 10 according to the first embodiment, by changing the feed speed according to the magnetic flux content at an induction motor, heat generation is reduced and stable heavy cutting is realized. More specifically, a case is assumed where, in order to overcome the drawback that heat is generated by the flow of the excitation current in the stator coil of the induction motor, a technique which weakens the magnetic flux of a rotating magnetic field or reduces the excitation current is employed when the load on the induction motor is low so that a high torque is not required. In this case, if heavy cutting (cutting producing a high cutting resistance) wherein a high load is applied on the spindle motor from the feed axis drive motor is started with a reduced torque due to the weakening of the magnetic flux at the induction motor as the spindle motor, the load changes suddenly at the start of cutting. However, in this embodiment, control is exerted so as to reduce the speed of the servo motor 145 if the current magnetic flux content $\Phi$ is low. If the speed of the servo motor 145 is low, the cutting resistance is relatively low. Thus, if the current magnetic flux content $\Phi$ is low, application of a high load on the spindle motor is prevented and stable heavy cutting is realized.

Additionally, in the numerical control system 10 according to the first embodiment, the feed speed is changed according to time elapsed from the start of cutting, the command speed being the target speed. More specifically, the feed speed of the servo motor 145 is changed from the initial speed to the command speed within a predetermined period according to a time constant. By doing so, the numerical control system 10 of this embodiment is configured to reduce heat generation and realize stable heavy cutting, and also to be capable of solving the problem of failing to increase the feed speed during application of a low load. The numerical control system 10 is capable of reducing heat generation and realizing stable heavy cutting, and capable of realizing efficient light cutting.

Second Embodiment

A second embodiment of the present invention will be described below by referring to FIG. 5. A numerical control system 20 according to the second embodiment has a configuration which is basically the same as that of the numerical control system 10 according to the first embodiment. Thus, the configuration of the numerical control system 20 will not be shown in the drawings. However, the numerical controller 100 is different from the first embodiment in that the numerical controller 100 further includes ratio calculation means 104 (not shown in the drawings).

The ratio calculation means 104 calculates the ratio of the current magnetic flux content $\Phi$ (at the start of cutting) acquired by the magnetic flux content acquisition means 102 to a maximum magnetic flux content $\Phi$max at the induction motor 125. Further, the ratio calculation means 104 transmits the calculated magnetic flux content ratio to the speed change means 103, and the speed change means 103 changes the rotation speed of the servo motor 145 based on the transmitted magnetic flux content ratio. The feed speed of the feed axis corresponds to the product of the rotation speed of the servo motor 145 and the pitch width of the ball screw 140. Thus, the feed speed of the feed axis is changed by changing the rotation speed.

Figure 5:
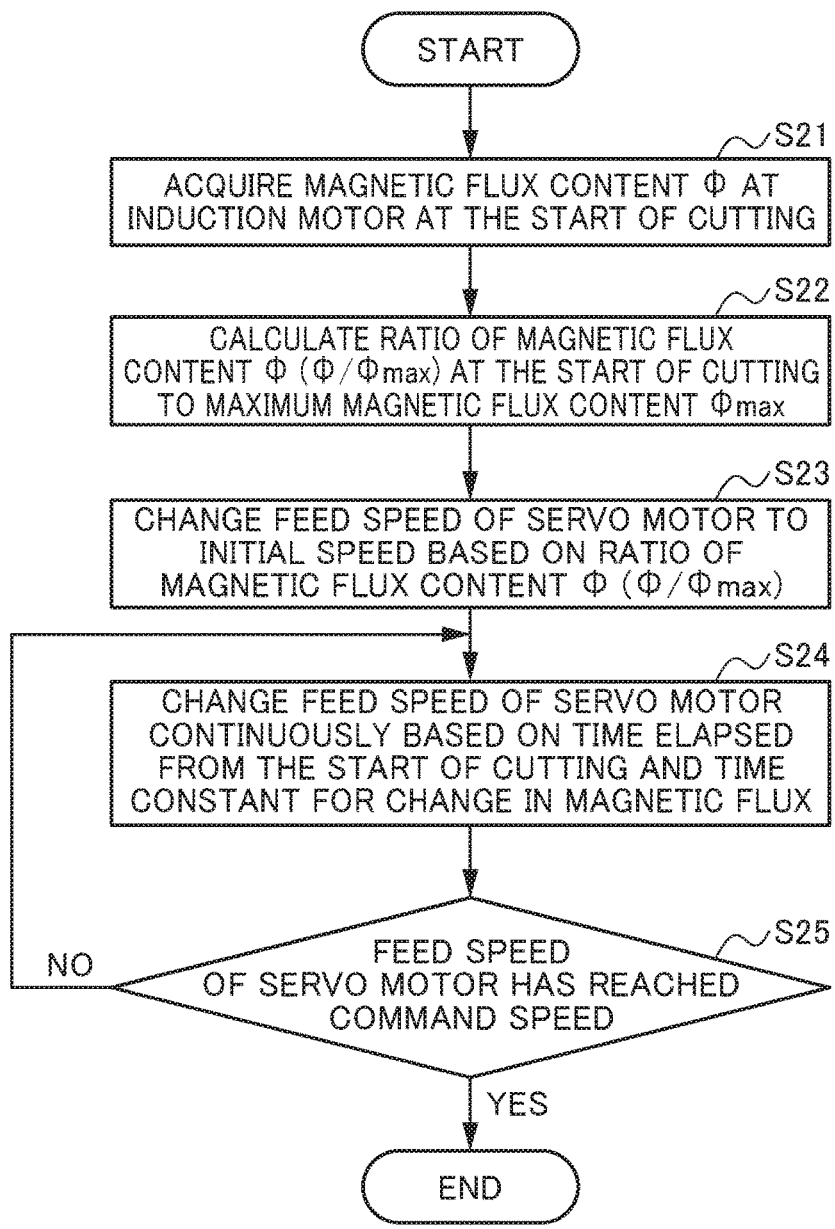
FIG. 5 shows the operation of a control system according to a second embodiment of the present invention.

FIG. 5 shows the operation of the numerical control system 20 according to the second embodiment. In step S21, the magnetic flux content acquisition means 102 acquires the current magnetic flux content $\Phi$ (at the start of cutting) at the induction motor 125 from the amplifier 130.

In step S22, the ratio calculation means 104 calculates the ratio $\Phi/\Phi$max of the current magnetic flux content $\Phi$ (at the start of cutting) acquired by the magnetic flux content acquisition means 102 to the maximum magnetic flux content $\Phi$max at the induction motor 125 (this ratio will also be called a "magnetic flux content ratio $\Phi/\Phi$max"). Then, the ratio calculation means 104 transmits the calculated magnetic flux content ratio $\Phi/\Phi$max to the first speed change means 103A.

In step S23, the first speed change means 103A commands the speed command means 108 to change the feed speed of the servo motor 145 at the start of cutting to an initial speed lower than the command speed, based on the magnetic flux content ratio $\Phi/\Phi$max calculated by the ratio calculation means 104. More specifically, if the current magnetic flux content ratio $\Phi/\Phi$max (at the start of cutting) is high, the rotation speed of the servo motor 145 is increased. If the current magnetic flux content ratio $\Phi/\Phi$max (at the start of cutting) is low, the rotation speed of the servo motor 145 is reduced. The feed speed of the ball screw 140 as the feed axis corresponds to the product of the rotation speed of the servo motor 145 and the pitch width of the ball screw 140. Thus, the feed speed of the feed axis is changed by changing the rotation speed. Then, based on the accepted change command, the speed command means 108 commands the servo motor 145 to change the feed speed to the initial speed (outputs initial speed information).

Next, in step S24, based on elapsed time calculated by the elapsed time calculation means 107 and a time constant for change in the magnetic flux content stored in the storage means 109, the second speed change means 103B commands the speed command means 108 to change the feed speed from the initial speed to the command speed continuously or intermittently. Then, based on the accepted change command, the speed command means 108 commands the servo motor 145 continuously or intermittently to change the feed speed from the initial speed to the command speed (outputs information on the changed speed continuously or intermittently).

Next, in step S25, if the feed speed of the servo motor 145 has not reached the command speed (N), the processing returns to step S24. If the feed speed of the servo motor 145 has reached the command speed (Y), the processing is finished and the speed command means 108 outputs the command speed to the servo motor 145.

Effect Achieved by Second Embodiment

In the numerical control system 20 according to the second embodiment, as with the numerical control system 10 according to the first embodiment, heat generation is reduced and stable heavy cutting is realized, while efficient light cutting is also realized.

Third Embodiment

A third embodiment of the present invention will be described below by referring to FIGS. 6 to 8.

Figure 6:
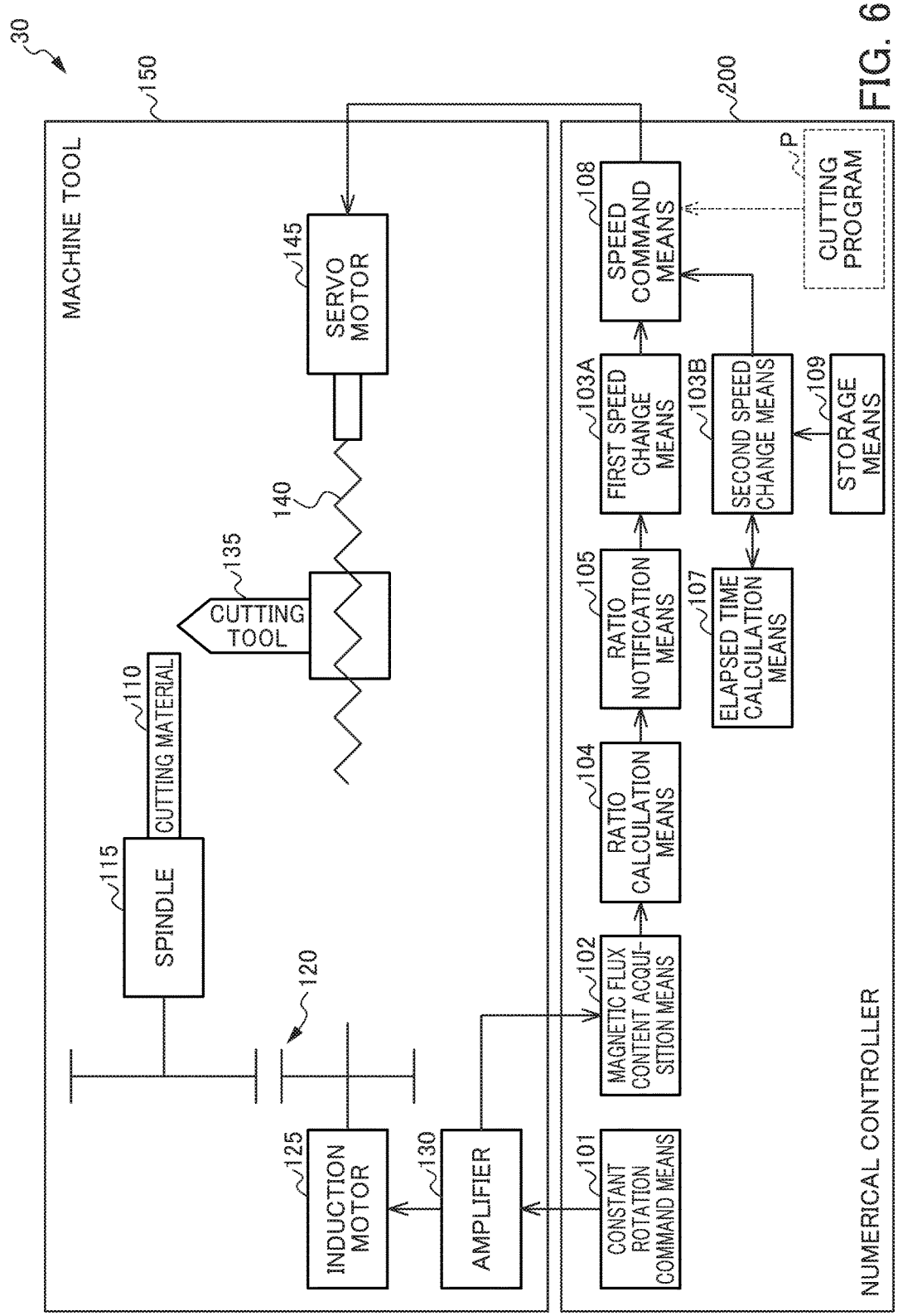
FIG. 6 shows the configuration of a control system according to a third embodiment of the present invention.

FIG. 6 shows an example of the configuration of a numerical control system 30 according to the third embodiment of the present invention. Components of the numerical control system 30 which are the same as those of the numerical control system 10 according to the first embodiment will be identified by the same signs and will not be described.

The numerical control system 30 differs from the numerical control system 10 according to the first embodiment in that it includes a numerical controller 200. The numerical controller 200 differs from the numerical controller 100 according to the first embodiment in that it further includes ratio calculation means 104 and ratio notification means 105. Like the ratio calculation means 104 of the second embodiment, the ratio calculation means 104 of the third embodiment calculates the ratio (magnetic flux content ratio $\Phi/\Phi max$) of the current magnetic flux content $\Phi$ (at the start of cutting) acquired by the magnetic flux content acquisition means 102 to the maximum magnetic flux content $\Phi max$ at the induction motor 125. The ratio calculation means 104 transmits the calculated magnetic flux content ratio $\Phi/\Phi max$ to the ratio notification means 105. The ratio notification means 105 notifies the first speed change means 103A of the magnetic flux content ratio $\Phi/\Phi max$ received from the ratio calculation means 104. While not shown in the drawings, the numerical controller 200 may have components and functions similar to those of a general numerical controller.

Figure 7:
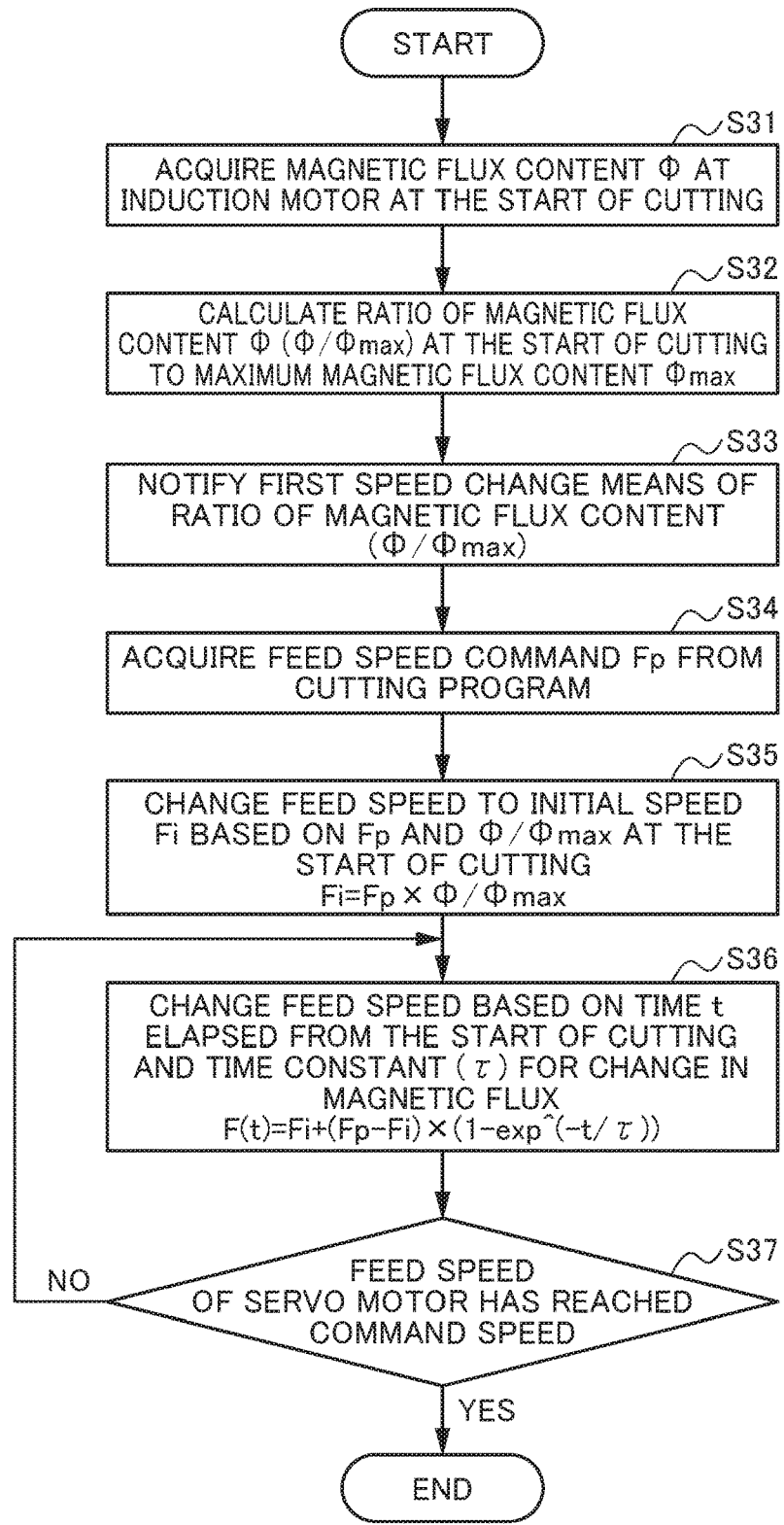
FIG. 7 shows the operation of the control system according to the third embodiment of the present invention.

FIG. 7 shows the operation of the numerical control system 30 according to the third embodiment. In step S31, the magnetic flux content acquisition means 102 acquires the current magnetic flux content $\Phi$ (at the start of cutting) at the induction motor 125 from the amplifier 130.

In step S32, the ratio calculation means 104 calculates the ratio $\Phi/\Phi max$ of the magnetic flux content $\Phi$ acquired by the magnetic flux content acquisition means 102.

In step S33, the ratio notification means 105 notifies the first speed change means 103A of the magnetic flux content ratio $\Phi/\Phi max$ calculated by the ratio calculation means 104.

In step S34, the first speed change means 103A acquires a feed speed command value Fp as information on the command speed from the cutting program P executed by the numerical controller 200.

In step S35, the first speed change means 103A determines an initial speed Fi using the following formula: $Fi=Fp \times \Phi/\Phi max$. Then, the first speed change means 103A commands the speed command means 108 to change the feed speed of the servo motor 145 to the initial speed Fi. More specifically, if the current magnetic flux content ratio $\Phi/\Phi max$ (at the start of cutting) is high, the rotation speed of the servo motor 145 is increased. If the current magnetic flux content ratio $\Phi/\Phi max$ is low, the rotation speed of the servo motor 145 is reduced. The feed speed of the ball screw 140 as a feed axis corresponds to the product of the rotation speed of the servo motor 145 and the pitch width of the ball screw 140. Thus, the feed speed of the feed axis is changed by changing the rotation speed. Then, based on the accepted change command, the speed command means 108 commands the servo motor 145 to change the feed speed to the initial speed (outputs initial speed information).

Next, in step S36, based on elapsed time t(s) calculated by the elapsed time calculation means 107 and the time constant $\tau$(s) of change in the magnetic flux content stored in the storage means 109, the second speed change means 103B commands the speed command means 108 to change the feed speed from the initial speed to the command speed continuously or intermittently.

Figure 8:
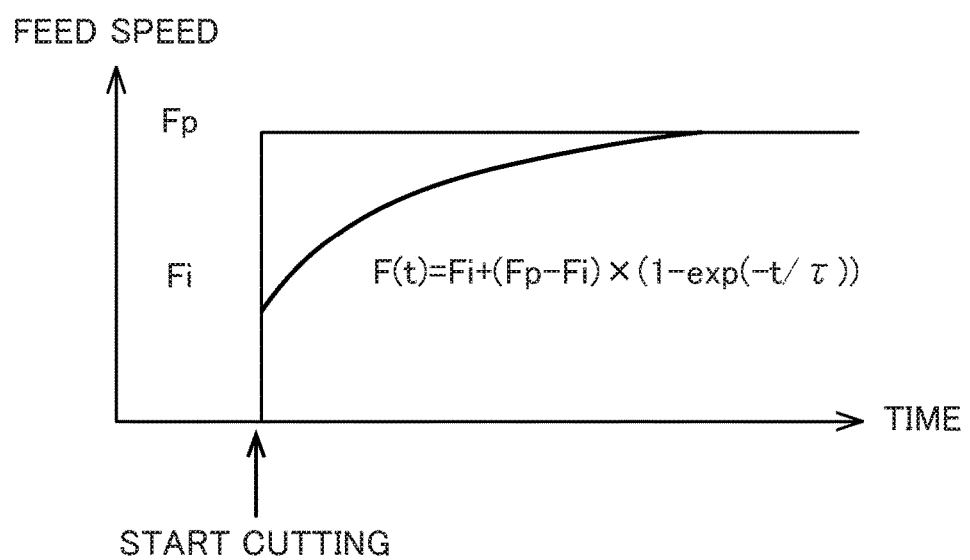
FIG. 8 is an explanatory view of a method of changing a feed speed by second speed change means according to the present invention.

More specifically, as shown in FIG. 8, the second speed change means 103B calculates the feed speed continuously or intermittently using the following formula F(t), and outputs a change command containing information on the calculated speed to the speed command means 108.

$$F(t)=Fi+(Fp-Fi)\times(1-exp(-t/\tau))$$

Then, based on the accepted change command, the speed command means 108 commands the servo motor 145 continuously or intermittently to change the feed speed from the initial speed to the command speed (outputs information on the changed speed continuously or intermittently).

Next, in step S37, if the feed speed of the servo motor 145 has not reached the command speed (N), the processing returns to step S36. If the feed speed of the servo motor 145 has reached the command speed (Y), the processing is finished and the speed command means 108 outputs the command speed to the servo motor 145.

Effect Achieved by Third Embodiment

In the numerical control system 30 according to the third embodiment, as with the numerical control system 10 according to the first embodiment and the numerical control system 20 according to the second embodiment, heat generation is reduced and stable heavy cutting is realized, while efficient light cutting is also realized.

The present invention is not limited to the embodiments of the present invention described above. The effects described in these embodiments are merely a list of the most preferable effects resulting from the present invention. The effects achieved by the present invention are not limited to those described in these embodiments. According to these embodiments, a control method implemented by the numerical controller 100 or the numerical controller 200 is realized by software. To realize the control method by software, programs constituting this software are installed on a computer (numerical controller 100 or numerical controller 200). These programs may be stored in removable mediums and distributed to users, or may be distributed to users by being downloaded to computers of the users through a network. Still alternatively, these programs may be offered to the computers (numerical controller 100 or numerical controller 200) of the users as a Web service through a network instead of being downloaded.

According to these embodiments, the numerical controller is configured to change the feed speed from an initial speed to a command speed based on a time constant for change in magnetic flux content, but it is not limited to such configurations. The numerical controller may be configured to change the feed speed, for example, so that the feed speed is increased according to elapsed time, or based on a different rule (such as a calculation formula).

EXPLANATION OF REFERENCE NUMERALS 10 20 30 Numerical control system
100 200 Numerical controller
102 Magnetic flux content acquisition means
103A First speed change means 103E Second speed change means
104 Ratio calculation means
105 Ratio notification means
107 Elapsed time calculation means
108 Speed command means
109 Storage means
125 Induction motor (spindle motor)
145 Servo motor (feed axis drive motor)
150 Machine tool

What is claimed is:

1. A numerical controller which controls a machine tool with a spindle motor formed from an induction motor, and a feed axis drive motor, the numerical controller comprising:
a processor; and
a non-transitory computer-readable medium having a program stored thereon that, when executed by the processor, causes the numerical controller to:
acquire magnetic flux content at the spindle motor;
store a time constant for change in the magnetic flux content at the spindle motor;
accept a command speed and issue a command instructing a feed speed to the feed axis drive motor;
calculate time elapsed from the start of cutting;
change the feed speed of the feed axis drive motor at the start of cutting to an initial speed lower than the command speed, based on the acquired magnetic flux content at the start of cutting; and
change the feed speed from the initial speed to the command speed continuously or intermittently based on the calculated elapsed time and the stored time constant for change in the magnetic flux content.

2. The numerical controller according to claim 1, wherein the numerical controller estimates magnetic flux content at the spindle motor and acquires the estimated magnetic flux content as a current magnetic flux content.

3. The numerical controller according to claim 1, wherein the numerical controller changes the feed speed of the feed axis drive motor to the initial speed, based on a magnetic flux content ratio which is the ratio of the magnetic flux content at the start of cutting to a maximum magnetic flux content.

4. The numerical controller according to claim 2, wherein the numerical controller changes the feed speed of the feed axis drive motor to the initial speed, based on a magnetic flux content ratio which is the ratio of the magnetic flux content at the start of cutting to a maximum magnetic flux content.

5. The numerical controller according to claim 3, wherein the program, when executed by the processor, further causes the numerical controller to:
calculate the magnetic flux content ratio based on the acquired magnetic flux content.

6. The numerical controller according to claim 4, wherein the program, when executed by the processor, further causes the numerical controller to:
calculate the magnetic flux content ratio based on the acquired magnetic flux content.

7. A numerical control method for controlling a machine tool with a spindle motor formed from an induction motor, and a feed axis drive motor, the numerical control method comprising:
acquiring, using a processor, magnetic flux content at the spindle motor;
storing, using the processor, a time constant for change in the magnetic flux content at the spindle motor;
accepting, using the processor, a command speed and issuing a command instructing a feed speed to the feed axis drive motor;
calculating, using the processor, time elapsed from the start of cutting;
issuing, using the processor, a first command for changing the feed speed of the feed axis drive motor at the start of cutting to an initial speed lower than the command speed, based on the magnetic flux content at the start of cutting acquired in said acquiring; and
issuing, using the processor, a second command for changing the feed speed from the initial speed to the command speed continuously or intermittently based on the elapsed time calculated in said calculating and the time constant for change in the magnetic flux content stored in said storing.

8. The numerical control method according to claim 7, wherein said acquiring comprises estimating magnetic flux content at the spindle motor and acquiring the estimated magnetic flux content as a current magnetic flux content.

9. The numerical control method according to claim 7, wherein said issuing the first command for changing the feed speed of the feed axis drive motor to the initial speed is based on a magnetic flux content ratio which is the ratio of the magnetic flux content at the start of cutting to a maximum magnetic flux content.

10. The numerical control method according to claim 8, wherein said issuing the first command for changing the feed speed of the feed axis drive motor to the initial speed is based on a magnetic flux content ratio which is the ratio of the magnetic flux content at the start of cutting to a maximum magnetic flux content.

11. The numerical control method according to claim 9, further comprising:
calculating, using the processor, the magnetic flux content ratio based on the magnetic flux content acquired in said acquiring.

12. The numerical control method according to claim 10, further comprising:
calculating, using the processor, the magnetic flux content ratio based on the magnetic flux content acquired in said acquiring.

13. A non-transitory computer-readable medium having a program stored thereon for causing a processor to execute a numerical control method for controlling a machine tool with a spindle motor formed from an induction motor, and a feed axis drive motor, the numerical control method comprising:
acquiring, using the processor, magnetic flux content at the spindle motor;
storing, using the processor, a time constant for change in the magnetic flux content at the spindle motor;
accepting, using the processor, a command speed and issuing a command instructing a feed speed to the feed axis drive motor;
calculating, using the processor, time elapsed from the start of cutting;
issuing, using the processor, a first command for changing the feed speed of the feed axis drive motor at the start of cutting to an initial speed lower than the command speed, based on the magnetic flux content at the start of cutting acquired in said acquiring; and
issuing, using the processor, a second command for changing the feed speed from the initial speed to the command speed continuously or intermittently based on the elapsed time calculated in said calculating and the time constant for change in the magnetic flux content stored in said storing.

14. The non-transitory computer-readable medium according to claim 13, wherein said acquiring comprises estimating magnetic flux content at the spindle motor and acquiring the estimated magnetic flux content as a current magnetic flux content.

15. The non-transitory computer-readable medium according to claim 13, wherein said issuing the first command for changing the feed speed of the feed axis drive motor to the initial speed is based on a magnetic flux content ratio which is the ratio of the magnetic flux content at the start of cutting to a maximum magnetic flux content.

16. The non-transitory computer-readable medium according to claim 14, wherein said issuing the first command for changing the feed speed of the feed axis drive motor to the initial speed is based on a magnetic flux content ratio which is the ratio of the magnetic flux content at the start of cutting to a maximum magnetic flux content.

17. The non-transitory computer-readable medium according to claim 15, further comprising:
   calculating, using the processor, the magnetic flux content ratio based on the magnetic flux content acquired in said acquiring.

18. The non-transitory computer-readable medium according to claim 16, further comprising:
   calculating, using the processor, the magnetic flux content ratio based on the magnetic flux content acquired in said acquiring.

* * * * *